(12) United States Patent
Stremsdoerfer

(10) Patent No.: US 8,507,043 B2
(45) Date of Patent: Aug. 13, 2013

(54) NON-ELECTROLYTIC METHOD FOR METALLIZING A SUBSTRATE BY THE REDUCTION OF METALLIC SALT(S) AND THE SPRAYING OF AEROSOL(S)

(75) Inventor: Samuel Stremsdoerfer, Lyons (FR)

(73) Assignee: Jet Metal Technologies, Saint Cyr au Mont d'Or (FR)

( * ) Notice: Subject to any disclaimer, the term of this patent is extended or adjusted under 35 U.S.C. 154(b) by 847 days.

(21) Appl. No.: 12/515,461

(22) PCT Filed: Nov. 26, 2007

(86) PCT No.: PCT/EP2007/062815
§ 371 (c)(1),
(2), (4) Date: Jul. 28, 2009

(87) PCT Pub. No.: WO2008/062070
PCT Pub. Date: May 29, 2008

(65) Prior Publication Data
US 2010/0075053 A1 Mar. 25, 2010

(30) Foreign Application Priority Data
Nov. 24, 2006 (FR) .................................. 06 10287

(51) Int. Cl.
*B05D 3/00* (2006.01)
(52) U.S. Cl.
USPC ........................................ 427/299; 427/421.1
(58) Field of Classification Search
USPC ............................................. 427/421.1, 299
See application file for complete search history.

(56) References Cited

U.S. PATENT DOCUMENTS

| | | | | |
|---|---|---|---|---|
| 3,783,005 A | * | 1/1974 | Kenney | 205/78 |
| 4,144,361 A | * | 3/1979 | Feldstein | 427/162 |
| 4,368,221 A | | 1/1983 | Stefan et al. | |
| 5,492,613 A | * | 2/1996 | Zhang et al. | 205/163 |

(Continued)

FOREIGN PATENT DOCUMENTS

| | | |
|---|---|---|
| FR | 2796962 A1 | 12/1998 |
| JP | H11-335858 A | 12/1999 |
| WO | 98/54378 A1 | 12/1998 |

OTHER PUBLICATIONS

English Translation of the Written Opinion of the International Searching Authority dated Jul. 7, 2009; International Application No. PCT/EP2007/062815, International File Date: Nov. 26, 2007.

(Continued)

*Primary Examiner* — Timothy Meeks
*Assistant Examiner* — Nathan T Leong
(74) *Attorney, Agent, or Firm* — Pearne & Gordon LLP

(57) ABSTRACT

The invention relates to a non-electrolytic method for metallizing a substrate by projecting an aerosol containing a solution of an oxidant metallic cation and of a reducing agent; said method comprising a step of -a- wetting the substrate; starting to project a metallisation according to a succession of projecting phases alternating with relaxing phases: (i) by adjusting the duration Dp of the projection phases and the duration Dr of the relaxing phases from a metallisation constant k intrinsic for each metal; and (ii) by adjusting the projection flow-rate. The metallisation projection is carried out dynamically by displacing projection means relative to the substrate in order to carry out a periodical scanning, wherein Dp correspond to the duration during which the surface unit in question is submitted to the continuous projection of the aerosol and Dr corresponds to the duration during which the part is not submitted to projection.

18 Claims, 2 Drawing Sheets

(56) References Cited

U.S. PATENT DOCUMENTS

| | | | | |
|---|---|---|---|---|
| 5,976,383 | A | * | 11/1999 | Guess et al. ............... 210/711 |
| 6,268,016 | B1 | | 7/2001 | Bhatt et al. |
| 2005/0008786 | A1 | * | 1/2005 | Dubin et al. ............. 427/421.1 |
| 2005/0022732 | A1 | * | 2/2005 | Ito et al. ................... 118/300 |

OTHER PUBLICATIONS

"Copper Deposition by Dynamic Chemical Plating", G. Stremsdoerfer et al., Journal of Materials Science, vol. 38, pp. 3285-3291, XP002442205, 2003.

* cited by examiner

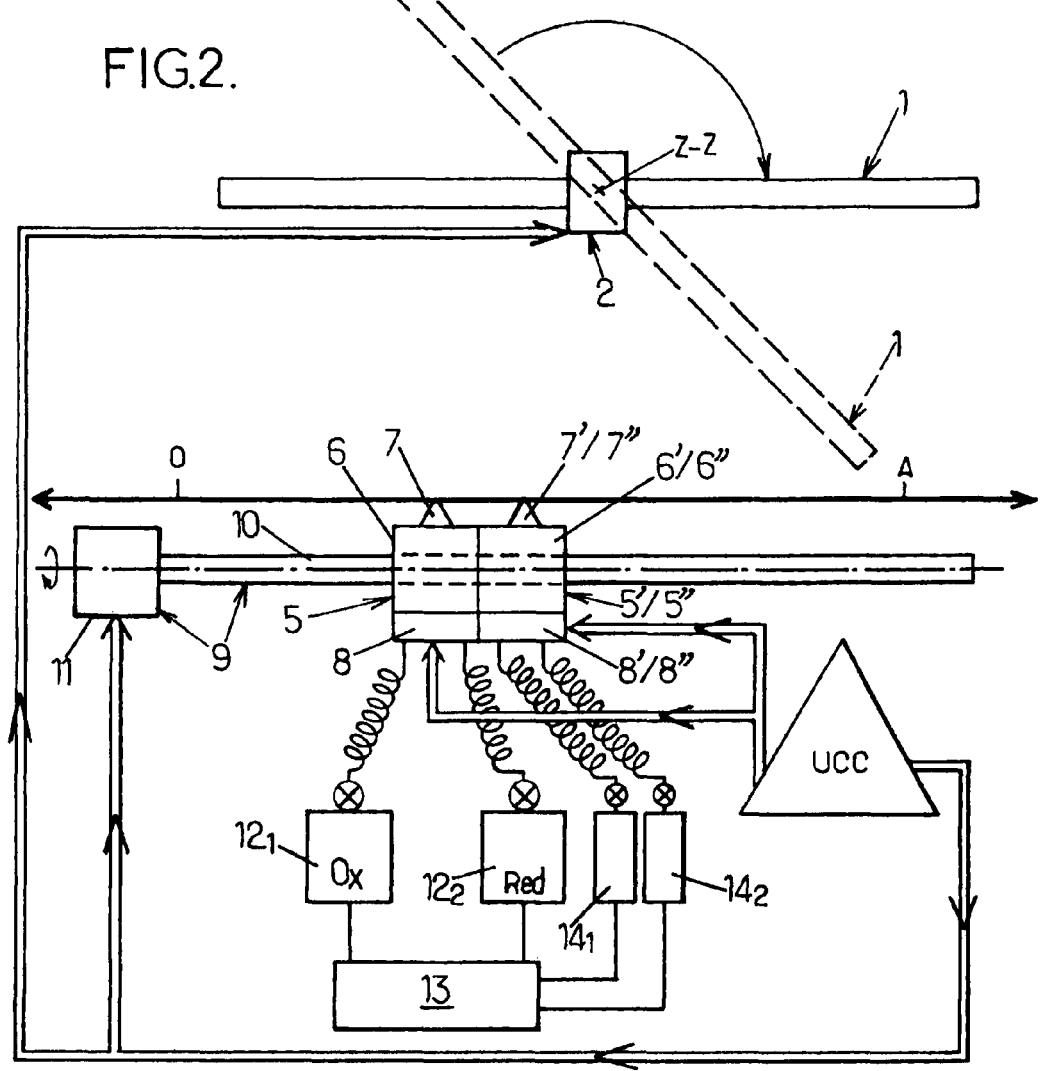

FIG.3.
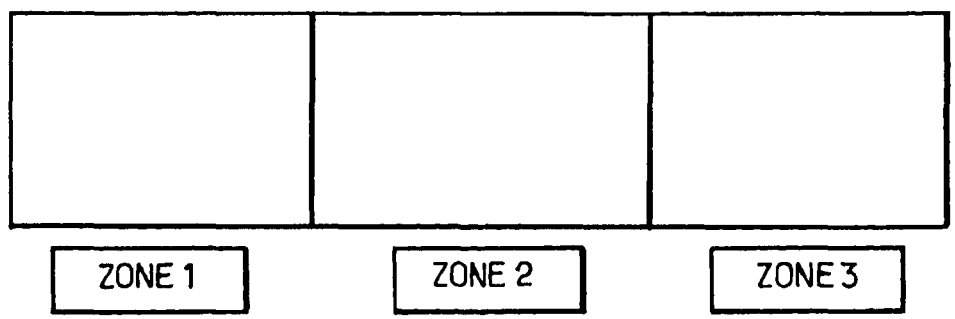
 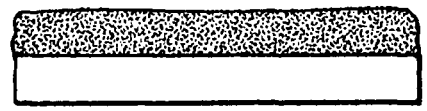
FIG.4A. FIG.4B.

NON-ELECTROLYTIC METHOD FOR METALLIZING A SUBSTRATE BY THE REDUCTION OF METALLIC SALT(S) AND THE SPRAYING OF AEROSOL(S)

TECHNICAL FIELD

The technical field of the invention is that of surface treatments, in particular treatments of the coatings of a substrate or material of any kind, in particular non-conductive materials such as plastics, (e.g. Acrylonitrile-Butadiene-Styrene, polypropylene), using a metallic film, in mono- or multi-layers and comprising a single metal or metal alloy.

More precisely, the invention relates to a non-electrolytic method for metallizing a substrate of any kind, for example non-conductive, by spraying an aerosol containing a solution of oxidizing metal cation and reducing agent capable of converting this cation to metal, in order to form a film deposited on the surface of the substrate to be metallized. This metallic film can comprise a filler of fibres and/or particles and thus form a composite film.

Generally, the substrates more specifically concerned by metallization, are non-conductive materials such as plastics, glass, ceramics, wood, minerals, articles made of plaster or cement and a great number of other non-conductive objects such as vegetables (flowers), insects (butterflies) or articles sculpted from wood etc.

PRIOR ART

Background to the Problem

One of the oldest industrial applications involving the deposition of metallic film is the silvering of glass, for manufacturing mirrors by electrolytic (RUOLZ and ELKINGTON method) or chemical route.

Nowadays, metal depositions have extended their field of use to include multiple and various industrial applications: mechanical, electronic, optical, magnetic supports. Thus for example the electromagnetic shielding of plastic casings constituting electronic equipment is a rapidly expanding activity.

On reading the above, it will have been understood that for metallization "by wet route" a distinction is made between two major types of technique, namely the electrolytic technique on the one hand, and the chemical technique on the other hand. With regard to the electrolytic deposition techniques in a liquid medium, there can be mentioned galvanoplasty, electroforming, as well as electro-refining, which are commonly used in industry. These electrochemical metal depositions involve the use of an external current source. Obtaining a metallic coating with a thickness comprised between 350 and 500 μm, requires more than an hour under industrial conditions. Metallization by electrolytic route is therefore expensive. It is also complex as it requires the use of relatively sophisticated equipment.

By contrast, the chemical deposition techniques by definition require no external current source. The most widespread method in these deposition techniques consists of immersing the pieces to be treated in a bath mainly containing three agents: a metal salt, a reducing agent, a complexing agent, which avoids the spontaneous reduction and precipitation of the bath. On contact with the surface of the piece to be metallized, said surface being catalytic or having been treated in order to become catalytic, the oxidation-reduction reaction begins and maintains itself. This method allows the functionalization of numerous substrates, both conductive and dielectric.

The advantages linked to these techniques of chemical metallization by immersion, do not however compensate for a certain number of drawbacks, among which there can be mentioned:

- significant capital expenditure and technical problems inherent in the treatment of large pieces to be metallized;
- the need to dismantle the pieces to be treated;
- the instability of the deposition baths and, in particular, of the composite deposition baths which make it possible to incorporate particles in a metal matrix, in order to give the film a particular functionality, the presence of such particles in suspension in the bath in fact promoting precipitation;
- deposition kinetics limited to 20 pm of thickness per hour;
- the technical difficulty linked to the simultaneous co-deposition of different metals;
- restricted range of metals or alloys which can be deposited;
- relatively high operating temperature of approximately 95° C.;
- impossibility of obtaining of the localized depositions of metallic coatings;
- adherence of the deposited metallic films to the substrate requiring improvement, and often unreliable.

As indicated above, one of the major applications of these chemical depositions, is the production of mirrors by silvering. This chemical metallization, as is the case with other analogous applications involving non-catalytic non-conductive substrates, necessarily comprises preliminary stages of sensitization and/or activation of the surface to be treated, in order to make the latter catalytic. In a standard fashion, the preliminary sensitization stage involves applying a solution of stannous chloride ($SnCl_2$) to the surface to be treated. This sensitization stage can be completed by an activation stage involving a solution of palladium chloride ($PdCl_2$), then finally rinsing with hydrochloric acid or soda.

It is clear that the requirement to carry out these preliminary stages when dealing with non-catalytic supports or substrates, represents a serious industrial constraint, consuming time, energy and resources.

The patent U.S. Pat. No. 5,492,613 discloses a method for the non-electrolytic metallization of non-conductive materials (for example glass) comprising the following stages:

1. optional mechanical or chemical roughening of the surface,
2. sensitization of the surface by brushing or spraying of a solution of stannous chloride,
3. activation of the sensitized surface by brushing or spraying of an aqueous solution comprising $AgNO_3$, ammonia, ethanol and alkylsulphonate, the Silver or Palladium ions being intended to oxidize the $Sn^{2+}$ ions, so as to form a colloid comprising nucleation centres,
4. continuous brushing or spraying of a standard chemical metallization bath comprising copper ions complexed by triethanolamine type chelating agents, EDTA and tartrate of the formol type reducing agents, and $Na_2CO_3$ type buffers.

The patent U.S. Pat. No. 6,268,016 describes a method for metallizing printed circuits with copper which includes the following stages:

1. optional chemical roughening of the surface using a strong acid for example,
2. sensitization/activation by the deposition of a colloidal suspension (Pd/Sn),
3. spraying of a solution of surfactant in order to spread the metallic deposit, 4. determination of the surface tension and adjustment of the quantity of surfactant added to the metallization solution,
5. metallization by continuous spraying of a standard chemical metallization bath containing copper ions.

The methods described in the abovementioned references necessarily comprise a stage of sensitization with $SnCl_2$ and/or a stage of activation with $PdCl_2$ or $AgNO_3$. This is particularly restrictive industrially.

The range of the substrates which can be envisaged with these known methods is relatively restricted. These techniques also have the drawback of being relatively complex and expensive. The metallization films obtained by these methods are simply physically adsorbed on the surface. This means that their characteristics of adhesion to the substrate are not reliable. Finally, these spraying techniques which initially appeared attractive, have proved disappointing as regards the cost and quality of the metallic coatings obtained, and similarly as regards the simplicity of implementation and the range of treatable substrates.

Furthermore, the prior documents relating to the metallization by spraying of oxidizing/reducing aerosols, are limited to silver and gold. Furthermore, given their basic defects, they can only be an intermediate stage in the metallization of a substrate and not a metallization technique per se. Furthermore, they do not make it possible to envisage producing deposits based on metal alloys or deposits of composite metallic coatings. Furthermore, the thicknesses of silver are very limited (maximum of 0.15 μm) and kinetically very slow.

In order to remedy these drawbacks, the patent FR-B-2763962 has proposed a method of chemical metallization by oxidizing/reducing (Ox/Red) aerosol spraying(s), in which the spraying is carried out according to one or more judiciously chosen sequences of spraying phases and relaxation phases of specific durations, such that the Ox/Red electronic ratio in the liquid mass sprayed by aerosol onto the substrate, is comprised within a given interval.

This non-electrolytic method of metallizing a substrate, by spraying at least one aerosol containing at least one metal in the cationic (oxidizing) form and at least one reducing agent, capable of converting the metallic cation to metal, is characterized in that it essentially involves:
-a- optionally sensitizing and/or activating the surface of the substrate to be metallized,
-b- carrying out the spraying according to a succession of at least two spraying phases, alternating with relaxation phases:
  (i) by setting the duration of the spraying phases between $10^{-2}$ and 5 s, preferably between $0^{-1}$ and 3 s for the same unit area, and the duration of the relaxation phases between $1 \times 10^{-2}$ and 10 s, preferably between $2 \times 10^{-1}$ and 4 s for the same unit area, the durations of these spraying and relaxation phases being identical to or different from each other,
  (ii) and by adjusting the spraying flow rate(s), such that the Ox/Red electronic ratio is comprised between 0.01 and 15, preferably between 0.5 and 8, thus allowing the formation of a metallic film chemically adherent to the substrate;
-c- interrupting the spraying as soon as the intended level of metal deposition is reached.

This method in particular has the following advantages:
i) it is applicable to a multiplicity of conductive or non-conductive substrates,
ii) the range of the metals or alloys which can be deposited is very wide,
iii) it is simple to implement and it is economical,
iv) the solutions used are stable,
v) the thickness of the deposition can be easily controlled,
vi) it is possible to produce alloys or composite coatings,
vii) the levels of adherence of the metallic film to the substrate, are completely satisfactory,
viii) the preliminary sensitization and/or activation stages are not absolutely necessary.

PROBLEM TO BE SOLVED

Objectives

One of the essential objectives of the present invention is to improve the method of chemical metallization by oxidizing/reducing (Ox/Red) aerosol spraying(s) according to the patent FR-B-2 763 962.

The sought improvements are found in particular in at least one of the following fields:
industrialization and automation of the method;
promoting the mixture of the active ingredients (oxidizing agent and reducing agent);
homogeneity and regularity of the surface and thickness of the abovementioned sprayed mixture;
increase in the hardness of the deposits;
reducing in the consumption of raw materials;
optimizing the economy of the metallization by recycling of the by-products.

BRIEF DESCRIPTION OF THE INVENTION

This objective, among others, is achieved by the present invention which relates, firstly, to an improved non-electrolytic method for metallizing at least part of the surface of a substrate (hereafter called the surface to be metallized), by spraying, using suitable means, of at least one aqueous and/or organic aerosol containing at least one metal in the cationic (oxidizing) form and at least one reducing agent, capable of converting the metallic cation to metal, of the type of those essentially consisting of: -a- optionally sensitizing and/or activating the surface to be metallized, -b- carrying out the metallization spraying according to a succession of at least two spraying phases, alternating with relaxation phases: (i) setting the duration Dp of the spraying phases between $10^{-2}$ and 5 s, preferably between $10^{-1}$ and 3 s for the same unit area, and the duration Dr of the relaxation phases between $10^{-2}$ and 10 s, preferably between $2 \times 10^{-1}$ and 4 s for the same unit area, the durations Dp and Dr of these spraying and relaxation phases being identical to or different from each other, (ii) and adjusting the spraying flow rate(s), such that the Ox/Red electronic ratio is comprised between 0.01 and 15, preferably between 0.5 and 8, and thus allows the formation of a metallic film which is chemically adherent to the substrate;-c- interrupting the spraying as soon as the intended level of metal deposition is reached, the improvement consists in particular in that it is envisaged:
to implement at least one preliminary stage -$a_p$- of wetting the substrate which involves bringing the latter into contact with at least one wetting fluid, so as to form a fluid film on at least part of its surface;
and, following the wetting -$a_p$-, to commence the spraying according to stage -b- at the latest 60 s, preferably at the latest 40 s, and, still more preferentially, at the latest 20 s after the end of the wetting.

The durations Dp and Dr of spraying and relaxation respectively are defined on the basis of a constant k of metallization intrinsic to each metal such that k=Dp+Dr, the constant k being preferably comprised between $10^{-1}$ and 13 s and still more preferentially between 0.5 and 9 s.

Preferably, the improvement also has the following characteristics:
- at least part of the metallization spraying is carried out dynamically by moving the spraying means with respect to the substrate so as to carry out a periodic sweep of at least 80%, preferably of at least 90%, and, still more preferentially of at least 95% of the surface to be metallized;
- for a given unit area comprised within the sweep zone:
  - the spraying phase has a duration Dp corresponding to the duration for which the unit area considered is subjected to the spraying, preferably continuous, of the aerosol,
  - the relaxation phase which follows this spraying phase has a duration Dr corresponding to the duration of the sweep of the remainder of the surface to be metallized by the spraying means or corresponding to the duration for which the substrate is not subjected to the spraying,
- the movement of the spraying means is defined such that:
  - said spraying means are moved along to a path $T_{OA}$ between an point of origin (O) and an arrival point (A) at a spraying movement speed $V_{OA}$,
  - as soon as the spraying means reach the point (A), they return to the point (O) at a speed $V_{AO}$ of movement without spraying along a path $T_{AO}$;
    - $V_{AO}$ being calculated by taking into account the distance between (A) and (O) and $V_{OA}$, so that the duration Dr of the relaxation phase of each unit area of the surface to be metallized swept by the spraying means is as defined above, this calculation preferably being carried out by a processing and control unit UCC (preferably a microcomputer) controlling the spraying means and a movement system for said spraying means;
- optionally, during at least part of the metallization spraying, the substrate is rotated.

In a variant, the improvement has the following characteristics:
- at least part of the metallization spraying is carried out dynamically by moving the spraying means with respect to the substrate and/or by moving the substrate with respect to the spraying means so as to carry out a periodic sweep of at least 80%, preferably at least 90%, and, still more preferentially at least 95% of the surface to be metallized;
- for a given unit area and comprised within the sweep zone:
  - the spraying phase has a duration Dp corresponding to the duration during which the unit area considered is subjected to the spraying, preferably continuous, of the aerosol,
  - the relaxation phase which follows this spraying phase has a duration Dr corresponding to the duration of the sweep of the remainder of the surface to be metallized by the spraying means.
- the movement of the substrate with respect to the spraying means being preferably a rotation.

The improvement according to the invention confers an industrial dimension (pilot stage and larger scale) on the metallization method to which it relates, whilst improving the quality of the metallic depositions over large surface areas, in terms of regularity and hardness of the metallic layers deposited, but also with regard to the control and reproducibility of the properties of said deposited metallic layers, among other things. These technological advances are achieved without detriment to the advantages of the metallization method according to the patent FR-B-2 763 962, namely in particular advantages i) to viii). The latter can even be improved in certain cases set out above.

The improved metallization method according to the invention also makes it possible to obtain metallic layers the resistivity of which is lowered (better conduction). Without wanting to be bound by the theory this may explain the fact that the oxidation of the layers is less, due to the better management offered by the invention with regard to the supplies of chemical solutions consumed (Ox/Red).

Secondly, the present invention relates to a device for the implementation of the improved non-electrolytic metallization method according to the invention characterized in that it comprises:
- means for holding the substrate to be metallized, optionally equipped with means for rotating the substrate;
- means for wetting the substrate beforehand;
- means for spraying the metal in cationic (oxidizing) and reducing form;
- optional rinsing means;
- a system for the movement of the spraying means, or even the wetting means and/or the rinsing means;
- and at least one processing and control unit UCC (preferably a microcomputer) controlling the spraying means and movement system for said spraying means.

DETAILED DESCRIPTION OF THE INVENTION

The improved method according to the invention has the advantage of being applicable to a multiplicity of conductive or non-conductive substrates, among which there can be mentioned metals such as copper, non-anodized aluminium, mild steel, iron, nickel, magnesium, titanium and metal alloys such as brass, bronze, stainless steels or plastics such as ABS, PVC, the polycarbonates, polypropylenes, methyl polymethacrylates, epoxy resins, glass, ceramics, semi-crystalline polymers, wood, polyesters.

Similarly, the range of metals or alloys which can be deposited is very wide. As regards the metals, these can be advantageously selected from group VIII of the periodic table as well as from groups Ib, IIb, IIIc, IVa (transition metals) and VI b of the periodic table. By way of example, there can be mentioned copper, nickel, zinc, cobalt, tin, boron, tungsten and alloys thereof. Different binary and tertiary alloys based on Ni, Co, Zn, Fe, Cu and B can be produced using a mixture of metal salts. As examples of alloys, there can be mentioned: Ni—B, Ni—B—Zn, Ni—Cu—B, Ni—Co—B, Ni—Fe—B, Ni—Cu—Co—B, NiSn—B etc.

This improved method also has the advantages of simplicity of implementation and low cost. It makes it possible to metallize very large pieces without significant capital expenditure. The infrastructure necessary for the implementation of this method is light, therefore inexpensive, and reusable irrespective of the solutions of oxidizing agents and reducing agents used.

It makes it possible to obtain localized deposits by spraying the reagents, as for painting, through a mask defining geometric shapes in two dimensions, or by spraying directly onto the previously masked items. It is also possible to cover only a single surface of an item in order to avoid the operation of masking the other surface. The stability of the solutions used is a definite asset in an industrial context. The thickness of the deposit can be easily controlled. It is possible to produce alloys or composite coatings, i.e. multilayers in which alternating layers of at least two different metals are superimposed.

The levels of adherence of the metallic film to the substrate are completely satisfactory. Moreover, it should be noted in this regard that the metallic film obtained according to this method, is chemically adsorbed on the surface of the substrate. This is a feature which is determinant with the regard to adherence and which is, moreover, completely distinctive in relation to the deposits according to the state of the art. It should be noted that the preliminary stages of sensitization and/or of activation are not absolutely necessary, as was the case previously for non-catalytic substrates. In fact, for non-catalytic substrates, it is envisaged, according to the invention, to implement stage a and/or carry out an activation in situ which involves incorporating in the spraying aerosol or aerosols at least one coupling agent, acting as a surface modifier and making it possible to improve the adherence of the metallic films to non-catalytic substrates such as plastics and/or to catalyze the reaction on the surface. This simplifying variant is explained in more detail hereafter.

According to the invention, it appeared opportune to control the temperature of the metallization enclosure. By way of example, this temperature of the enclosure can be comprised between 20 and 60° C.

The regulation of the temperature of the metallization enclosure is easily achieved using any appropriate air-conditioning equipment.

The optional preliminary sensitization and/or activation stages -a- are carried out, in a manner known per se, by application (e.g. spraying, immersion) of stannous chloride ($SnCl_2$) solutes or of a solution of $SnSO_4/H_2/SO_4$/quinol/alcohol followed by application (spraying or immersion) of a solution of palladium or silver capable of reacting with the $Sn^{2+}$ in order to form nucleation sites on the surface of the substrate, or also of a colloidal PdSn solution formed ex situ. For more details, reference can be made for example to "*Metal Finishing Guidebook and Directory Issue*", 1996 Metal Finishing publication, page 354, 356 and 357. H. Narcus "*Metallizing of Plastics*", Reinhold Publishing Corporation, 1960, Chapter 2, page 21. F. Lowenheim, "*Modern electroplating*", John Wiley & Sons publication, 1974 Chapter 28, page 636.

One of the features of the improvement according to the invention is based on the preliminary stage -$a_p$- of wetting the substrate so as to form a fluid film on the latter, knowing that the spraying according to stage -b- is initiated advantageously when the fluid film produced by the wetting is also present on the surface of the substrate. In other words, advantage is taken of the fact that the spraying according to stage -b-commences at the latest 60 seconds, preferably at the latest 40 seconds, and still more preferentially, at the latest 20 seconds after the end of the wetting.

Within the meaning of the present invention for example, by the expression "end of the wetting" is meant the time when the bringing into contact of all or part of the surface of the substrate with at least one source of wetting fluid (liquid or vapours) is definitely finished.

The presence of this film produced by the wetting, preferably in combination with moving the substrate, makes it possible to ensure a homogeneous deposition of the metallic layer, by promoting the mixing of the two active ingredients (oxidizing agent and reducing agent) sprayed simultaneously as well as the spreading of the mixture.

Advantageously, the preliminary wetting stage -$a_p$-, i.e. the bringing into contact of all or part of the surface of the substrate with at least one source of wetting fluid (liquid or vapours), is carried out by spraying an aerosol of wetting liquid and/or by immersion in a bath of wetting liquid, said wetting liquid being optionally heated, and/or by spraying onto the substrate of vapours of wetting liquid, which condense on the surface of said substrate.

The heating of the wetting liquid, like the control of the temperature of the metallization enclosure, are useful ways of catalyzing the deposition kinetics at the start of stage -b- of spraying of the oxidizing/reducing aerosol. By way of example, the heating temperature of the wetting liquid can be for example comprised between 20° C. and 60° C.

The choice of the wetting liquid is preferably made from the group comprising: deionized or non-deionized water, to which at least one anionic, cationic or neutral surfactant is optionally added, an alcoholic solution comprising at least one alcohol (for example isopropanol or ethanol) and mixtures thereof.

In the wetting variant according to which the wetting liquid is converted to vapours which are sprayed onto the substrate on which they condense, it is preferable that the liquid is essentially aqueous for obvious reasons of industrial suitability.

As has been understood, the duration of the wetting is not a parameter of prime importance to the improvement according to the invention. This duration of wetting depends on the surface of the substrate considered, the chosen technique, spraying or immersion, and in the case of wetting by spraying, the wetting aerosol spraying flow rate.

The means for carrying out the spraying of an aerosol or of vapours of wetting liquid for this preliminary stage -$a_p$- can be identical to or different from those used for the spraying of the oxidizing/reducing aerosol. Preferably, these spraying means are different. It is possible to use for example an independent pneumatic single-nozzle spray gun.

Advantageously, the UCC can also command and control the execution of the preliminary wetting stage -$a_p$- in particular by actuating the spraying of the aerosol or vapours of wetting liquid and the movement of the corresponding spraying means.

Beyond this wetting aspect, the improvement according to the invention partly consists of a dynamic operating method during the spraying and relaxation phases. This dynamic mode relates to, on the one hand, the spraying means and, on the other hand, optionally but nevertheless advantageously, the substrate itself. Thus, according to the latter optional variant, the substrate can be at least partially rotated during the metallization spraying (stage -b-). The substrate is rotated during stage -b-, preferably intermittently, at a speed comprised between 1 and 30 rpm, preferably between 5 and 20 rpm. The axis of rotation of the substrate can be any axis. For example, in the case where the spraying means have a straight path, the axis of rotation of the substrate can be substantially orthogonal to the axis of movement of the spraying means. The rotation of the substrate can be envisaged over a limited angular section. Thus, when the substrate has a general plane shape, its rotation can be carried out over an angle preferably comprised between 1 and 120° and corresponding for example to 45°. This rotation of the substrate can be intermittent during the spraying/relaxation phases.

In practice, the axis of rotation of the substrate may or may not pass through the centre of gravity of said substrate.

The speed of rotation of the substrate can vary between 1 and 20 revolutions per second, for example of the order of 10±2 revolutions per second.

According to the improvement according to the invention, the metallization spraying is carried out in a dynamic mode. Thus, the spraying means sweep the substrate surface to be metallized while spraying, preferably continuously, the oxidizing/reducing aerosol.

Preferably, the sweep covers the whole of the surface to be metallized.

This sweep is periodic, i.e. when the spraying means have traveled the path $T_{OA}$ between the point of origin O and the arrival point A at a speed of movement with spraying $V_{OA}$, they return to the point of origin O at a speed $V_{AO}$ of movement without spraying, along a path $T_{AO}$.

According to a preferred method of implementation of the improved method according to the invention, stage -b- is cyclic, each cycle comprising a spraying phase and a relaxation phase, corresponding to the spraying means moving from O to A and back and, moreover, the total number of N cycles implemented is chosen as a function of the level of deposition of metal finally sought and the level of deposition of metal obtained in each cycle, this total number of N cycles being comprised between 2 and 5000, preferably between 50 and 500, still more preferentially between 80 and 200.

The final level of deposition of metal and the level of deposition of metal per cycle are parameters which depend in particular on the spraying flow rates and on the speed of movement with spraying $V_{OA}$.

According to an advantageous characteristic, the spraying flow rates of stage -b- are adjusted such that, at the end of each spraying phase, the quantities of metallic (oxidizing) cation(s) and reducing agent(s) per $cm^2$ of surface to be metallized are the following (in $mg/cm^2$):

from 0.1 to 60, preferably from 0.5 to 20 for the oxidizing agent,
from 0.1 to 60, preferably from 0.5 to 20 for the reducing agent.

In the particular case where the oxidizing agent is nickel with a degree of oxidation II, the latter is present at 1 to 7 $mg/cm^2$, whereas the reducing agent is present on the surface of the substrate at 1 to 14 $mg/cm^2$, at the end of each spraying phase.

As regards the speed of movement with spraying $V_{OA}$, this is chosen as a function of the type of metal. In fact, certain metals require a longer spraying and therefore a slower speed of movement with spraying $V_{OA}$.

By way of example in the case where the path $T_{OA}$ is straight and direct, this speed of movement with spraying $V_{OA}$ is for example comprised between 0.01 to 10 m/s, preferably between 0.5 and 2 m/s, or even more precisely e.g. of the order of 1 m/s. Naturally, the invention is not limited to the case where the path $T_{OA}$ is straight and direct. Thus, it can be envisaged that for three-dimensional pieces (of general non-plane shape), this path $T_{OA}$ is also three-dimensional, for example helicoidal, in order to sweep the whole of the substrate surface to be metallized concerned.

As regards the return path $T_{AO}$, it is provided, according to the improvement according to the invention, that the return speed $V_{AO}$ on this path T, is such that, for each unit area of the surface to be metallized and for each cycle, the relaxation phase corresponds to the specifications of duration Dr comprised between $10^{-2}$ and 10 s, preferably between $2.10^{-2}$ and 4 s.

The durations of spraying and relaxation are defined by a constant k which varies according to the type of metal between $10^{-1}$ and 13 s, preferably between 0.5 and 9 s.

The calculation and control unit UCC should therefore be programmed such that the latter determines and controls the return movement of the spraying means from the arrival point A as far as the point of origin O, at a speed $V_{AO}$. For this purpose, the UCC acts on the spraying means in order to stop them as soon as the arrival point A is reached and also acts on the system for movement of said spraying means in order to return them in the inactive state to their origin point.

In a particular method of implementation according to which the path $T_{AO}$ is straight and direct, the formula for calculating $V_{AO}$ is as follows:

$$V_{AO}=AO/[k-(OA/V_{OA})]$$

Advantageously, the UCC is programmed in order also to command the starting-up of the spraying means as well as their initial movement along the path $T_{OA}$ at a speed $V_{OA}$ which can be, for example, comprised between 0.1 and 20 m/s, preferably between 1 and 6 m/s.

More generally, the speed $V_{OA}$ can be, for example, comprised between 0.01 and 20 m/s, preferably between 0.1 and 6 m/s.

According to a useful arrangement of the invention, at least one rinsing phase is provided, preferably after each sequence $\Delta S$ of n spraying/relaxation cycles.

Advantageously, the number n of spraying/relaxation cycles of each sequence $\Delta S$, is comprised for example between 2 and 30, preferably between 5 and 20.

Advantageously, the rinsing stage, i.e. the bringing into contact of all or part of the substrate surface with at least one source of rinsing liquid, is carried out by spraying of a rinsing liquid aerosol and/or by immersion in a bath of rinsing liquid. The means for carrying out the spraying of a rinsing liquid aerosol can be identical to or different from those used for the spraying of the oxidizing agent/reducing agent aerosol and/or of those utilized for the preliminary wetting stage -$a_p$-.

Preferably, these spraying means are different from the means used for spraying the oxidizing agent/reducing agent aerosol and are the same as those for wetting, which can be for example an independent pneumatic single-nozzle spray gun.

As is the case with the spraying means of the wetting aerosol, the spraying means of the rinsing liquid are preferably associated with a system for movement of said means.

According to a useful method of the present invention, the UCC can also command and control the execution of the rinsing stage in particular by actuating the spraying of the rinsing liquid aerosol and the corresponding movement of the spraying means.

The aerosols sprayed onto the substrate in the method according to the invention, are preferably obtained:

from solutions, advantageously aqueous, of the oxidizing metallic cation(s) and the reducing agent(s),
or from rinsing solutions,
or also if appropriate, from sensitization and/or activation solutions.

It follows that according to a preferred arrangement of the invention, the spraying aerosol(s) are produced by nebulization and/or atomization of solution(s) and/or of dispersion(s), so as to obtain a spray of droplets of a size less than 100 μm, preferably 60 μm, and still more preferentially comprised between 0.1 and 50 μm.

According to a first possible implementation of the improved method of the invention, at least one solution of metallic cation(s) and at least one solution of reducing agent(s) are simultaneously sprayed onto the surface, in one or more aerosols, in the same spraying phase. In the case in point, the mixing of the oxidizing solution with the reducing solution can be carried out just before the formation of the spraying aerosol or also by merging an aerosol produced from the oxidizing solution with an aerosol produced from the reducing solution, preferably, before they come into contact with the metallized substrate surface.

According to a second possible implementation of the improved method according to the invention, stage b involves spraying, during each spraying phase, and by means of one or more aerosols, at least one solution of metallic cation(s) or at least one solution of reducing agent(s), knowing that at least one exclusive oxidizing metal cation spraying phase and at least one exclusive reducing agent spraying phase are provided, the spraying phases of the oxidizing agent on the one hand and the reducing agent on the other hand preferably alternating. This second possibility corresponds to alternate spraying of the reducing solution(s) and the metallic salt(s)

It should be noted that the durations of the relaxation phases can be identical to or different from each other. The same applies to the spraying phases, as well as all the phases together.

In practice, according to this second possibility, one or more sequences $\Delta S''$ of "n" spraying/relaxation cycles are provided in which the spraying/relaxation cycles of the reducing agent alternate with the spraying/relaxation cycles of the oxidizing metal salt. The total number $N''$ of these spraying/relaxation cycles depends on the surface to be metallized and on the thickness sought for the metallization layer. This number $N''$ can, for example, be comprised between 4 and 5000, preferably between 50 and 500, still more preferentially between 80 and 200.

In the two possible implementations described above, it is possible to use, according to a variant, several different oxidizing metallic cations and one or more reducing agents, so as to produce a multilayer of different metals or alloys.

In order to do this, different sub-sequences $\Delta s$ of m successive spraying/relaxation cycles are carried out, each of these sub-sequences corresponding to a given metal or alloy, intended to form a metallization layer. m is greater than or equal to 2 and preferably comprised between 2 and 10 in the first possible implementation and m is greater than or equal to 4 preferably comprised between 4 and 20 in the second possible implementation. These sub-sequences are of identical or different duration and include and/or are separated from each other by one or more rinsing phases. In practice, it is preferable to provide at least one rinsing between two sub-sequences corresponding to different metals or alloys, i.e. after each sub-sequence $\Delta s$ of m spraying/relaxation cycles; m being comprised between 2 and 30, preferably between 5 and 20.

Within the framework of the second possible implementation, the combination of several oxidizing metallic cations in order to form a multilayer of different metals or alloys, is such that the different salts are, preferably, naturally sprayed separately from the reducing agent but also separately from each other and successively. It is self-evident that apart from the different nature of the metallic cations, it is possible to envisage using counter-anions which are different from each other.

In order to allow the implementation of stage -c-, the growth of the metallic coating deposited is monitored preferably using the change in weight, for example using a quartz balance equipped with a probe subjected to the spraying in the same way as the surface to be metallized.

According to another variant of the invention, it is ensured that the mixture of the oxidizing agent(s) and reducing agent(s) is metastable and, after spraying the mixture, the latter is activated such that the conversion to metal is triggered, preferably by bringing into contact with a primer, advantageously supplied by means of at least one aerosol, before, during or after the spraying of the reaction mixture. This variant makes it possible to pre-mix the oxidizing agent and the reducing agent while slowing down their reaction until they cover the surface of the substrate after spraying. The priming or activation of the reaction is then achieved by any physical (temperature, UV etc.) or chemical means.

Beyond the methodological considerations presented above and illustrated hereafter in the examples, it is now essential to provide some more precise information regarding the products utilized in the method according to the invention.

Water appears to be the most suitable solvent, without however excluding the possibility of using organic solvents, for the production of the solutions from which the sprayed aerosols are produced. The concentrations of oxidizing metal salt are comprised between 1 g/l and 60 g/l and preferably between 7 and 30 g/l.

The selection of the reducing agents is preferably made from the following group of products: sodium borohydrides, dimethylamine borane, hydrazine, sodium hypophosphite, formol, lithium aluminium hydrides, reducing sugars and mixtures thereof. The selection of the reducing agent makes it necessary to take account of the pH and the properties sought for the metallization film. This routine trial and error is within the scope of a person skilled in the art. The concentrations of reducing agent are comprised between 0.5 g/l and 60 g/l and preferably between 8 and 20 g/l.

As already explained above, the aqueous solutions constitute the most convenient basis for the production of aerosols for spraying oxidizing agent/reducing agent. According to a preferred arrangement, it is possible to provide that at least one of the starting solutions has the following added to it:

and/or at least one natural or synthetic resin or binding agent,
- and/or at least one organic or inorganic dye and/or pigment,
- at least one coupling agent, preferably chosen from the following products: titanates, aluminates, silanes, zirconates, zircoaluminates or mixtures thereof;
- and/or at least one brightening agent, preferably selected from the following products: sulphimides, sulphanamides, sulphonates, propargyl alcohol, thiourea, mercaptabenzothiazole or mixtures thereof;
- and/or at least one surfactant;
- and/or at least one filler, preferably selected from the following products:
  - fibres or particles of glass, carbon, Teflon, silicon carbide, graphite, diamond, oxides such as alumina, ceramics,
  - microcapsules containing lubricant,
  - or also calcium or sodium carbonates, barium sulphates, talc, silicates,
  - in fact any filler capable of modifying the rheological properties and the mechanical properties of the metallic films,
  - and the mixtures of these products.

The coupling agents act as surface modifiers due to their abilities to hydrolyze in aqueous medium in order to give rise to an amorphous and inorganic film, chemisorbed at the surface which serves as a "primer" for the surface and optionally as a catalyst for the reaction.

As classes of products preferred for the selection of these surface modifiers, reference may be made to the: titanates, aluminates, silanes, zirconates, zircoaluminates.

The titanates are particularly appropriate. The advantage of this activation by the titanates or analogues is that it takes place in situ without it being necessary to provide an activation stage prior to the spraying of the oxidizing agent/reducing agent. The properties of the titanate film depend on the quantity used. The performance is maximum when the surface to be modified contains functional groups (ketone, amine, epoxy etc.). The use of the titanates makes it possible to improve the adherence of the films in particular of nickel to plastic substrates as well as to catalyze the oxidation-reduction reaction in situ on the surface. The concentrations of titanates in the solutions are comprised between 0.1 and 12% by weight and preferably between 1 and 7%. As examples of brightening agents, there can be mentioned:

the sulphimides such as saccharine used in concentrations ranging from 0.1 g/l to 10 g/l and preferably between 1 and 5 g/l;

the sulphanamides such as benzosulphanamide used in concentrations ranging from 0.1 g/l to 12 g/l and preferably from 1 to g/l;

the sulphonates such as sodium naphthalene trisulphonate, used in concentrations of less than 4 g/l;

propargyl alcohol, thiourea, mercaptobenzothiazoles used in concentrations of less than 3 g/l.

The surfactants which can be used are useable in concentrations ranging from 1 to 5 times the critical micelle concentration CMC of the surfactant utilized. As examples of surfactants there can be mentioned: sodium dodecyl sulphate SDS (anionic: 2×CMC), sodium lauryl-sulphonate (anionic: 4×CMC) and polyoxyethylenonylphenylether (non-ionic: 1×CMC).

The addition of particles and/or fibres to the sprayed solutions makes it possible to obtain composite depositions. These particles or these fibres of organic or inorganic filler confer useful friction, roughening, hardness and toughness characteristics on the composite film, the matrix of which is metallic.

The organic fillers can for example be Teflon or PTFE polytetrafluoroethylene beads. The inorganic fillers can be for example graphite particles, glass beads, silica particles or also pigments or dyes.

The particles or fibres are put in suspension for example in the solution of metal salts. In this solution it is possible to use any particle capable of modifying the tribological properties of the deposited metallic film.

In any case, the composite films obtained for the method according to the invention have all the properties of the simple metallic films and are homogeneous.

According to the invention, the solutions can have numerous other additives added to them, such as in particular viscosity modifying agents such as ethylene glycol. A fine adjustment of the viscosity in fact makes it possible to avoid flow phenomena on the substrate. The reagents therefore remain in contact with the substrate in the same place for a longer time. It follows that the mass deposited and therefore the yield of the oxidation-reduction reaction are improved. On the other hand, the increase in viscosity improves the dispersion and suspension of the particles or fibres in the case of the development of a composite deposition.

The advantages of the improved method according to the invention are numerous. It is automated. The solutions are used in limited quantities compatible with economic requirements on the industrial scale. The adherence of the deposition is excellent whatever the substrate (metal, plastic, ceramic). It is possible to achieve significant thicknesses in a few minutes with kinetics of several tens of microns per hour. The coating can be obtained at ambient temperature, instantaneously, without the need for subsequent treatment (for example heat treatment). However, it is self-evident that such treatments can be envisaged if it is desired to modify the superficial structure of the deposition.

The depositions can be produced for the purposes of decoration, finishing and protection against corrosion (nickel, zinc, Cu etc). These depositions can also make it possible to functionalize the substrate by conferring particular surface properties (electric, magnetic, mechanical) upon it. It may for example provide protection for the plastic casing of electronic equipment in terms of electromagnetic shielding.

The improved method according to the invention not only makes it possible to reduce the consumption of raw materials, but it offers advantageous recycling possibilities.

Thus, according to an advantageous use of the improved method according to the invention:

the sludges which are produced at the end of the metallization and which contain metal oxides are recovered;

these sludges are filtered;

the retentate is dissolved using at least one strong acid;

the pH of the solution of retentate in the strong acid is increased so as to precipitate the metal hydroxide or successively the different metal hydroxides corresponding to the metal or metals used in the metallization the metal hydroxide precipitate(s) are precipitated separately;

and this (or these) metal hydroxide(s) are optionally recycled in the metallization method.

The recovery of the sludges is an operation which is easy to implement, as is the filtration.

The benefit of the improved method according to the invention is that the filtration makes it possible, on the one hand, to isolate from the sludges the solid material which contains the recyclable metal oxides, and, on the other hand, to produce a non-ecotoxic liquid filtrate which is therefore easy to manage in environmental terms.

The strong acid capable of being used for dissolving the filtration retentate is for example chosen from the group comprising nitric acid, sulphuric acid, boric acid, acetic acid and mixtures thereof.

The solution of strong acid(s) used for this dissolving has a concentration of strong acid(s) comprised between 0.5 and 5 moles per litre, preferably of the order of 1 mole per litre.

In order to increase the pH of the solution of retentate in the strong acid, a base chosen from the group comprising: soda, ammonia, lime and mixtures thereof is used for example.

The concentration of the basic solution used for this purpose is, for example, comprised between 0.1 and 5 mol/l, preferably between 0.5 and 3 mol/l, and still more preferentially between 1 and 2 mol/l.

The collection of the metal hydroxide precipitate(s) is carried out easily by filtration, decantation or centrifugation, for example.

The different solid metal hydroxide(s) obtained can easily be returned to solution and reused in the improved metallization method according to the invention.

According to another of these aspects, the present invention relates to a device for the implementation of the improved method as defined above.

By way of illustration of the device according to the invention, one embodiment example is described hereafter, among others, with reference to the attached drawings, in which:

FIG. 1 represents a front view of the substrate to be metallized supported by holding means also acting as means of rotation of said substrate;

FIG. 2 schematically represents a top view of the device according to the invention, in which the elements of FIG. 1 have been incorporated;

FIG. 3 represents a front view of the substrate to be metallized according to the protocol of Comparative Example 1

FIGS. 4A & 4B diagrammatically represent a longitudinal cross-section through the metallic depositions obtained at the end of the metallizations according to Comparative Example 1 and Example 1 respectively.

FIG. 1 shows a substrate of general rectangular plane shape, denoted by the reference 1. This substrate 1 is therefore in this example a thin parallelepipedic plastic polymer plate. This plate 1 is supported by holding means 2 comprising rotation means 3 (for example a motor associated with a digital variable drive) and support means 4 directly supporting the substrate 1. The optional rotation, preferably partial and alternating, of the substrate 1 is carried out about the vertical axis Z-Z.

FIG. 2 incorporates in top view, the substrate 1 mounted mobile in rotation on the rotation means 3 equipped with a digital variable drive. The device of FIG. 2 also comprises means 5 for spraying metal in cationic (oxidizing) form and reducing agent. These spraying means 5 include a part 6 bearing at least one spraying nozzle 7, in this case one, and a part 8 for admission, and optionally mixing, of the oxidizing and reducing solutions. These spraying means 5 are mounted on a movement system 9 comprising a shaft 10 supporting the means 5 and able to be driven in rotation by a motor 11.

As shown in FIG. 2, the device also includes a processing and control unit: UCC, preferably a micro-computer, controlling the spraying means 5, the system of movement 9 of said spraying means 5, and the rotation means 3 of the substrate 1.

The device comprises means 5'/5" for spraying aerosol or vapours of wetting liquid and rinsing liquid. These means 5'/5" are constituted by a part 6'/6" bearing at least one spraying nozzle 7'/7", in this case one, and a part 8'/8" for admission of the wetting fluid in liquid or vapour form. These spraying means 5'/5" are mounted on the movement system 9 described above which makes it possible to move the spray gun(s) for spraying vapours and/or aerosol of wetting liquid or rinsing liquid, by translational movement along paths $T_{OA}$ and $T_{AO}$.

The device also comprises tanks 12₁, 12₂, 14₁ and 14₂ connected to an air compressor 13, so as to be able to supply, respectively, the spraying means 5 with oxidizing solution 12₁ and reducing solution 12₂ and the spraying means 5'/5" with wetting liquid vapours or wetting liquid 14₁ and rinsing liquid 14₂, depending on the case.

The double lines with arrows which connect the UCC to the spraying means 5 to the movement system 9 and to the means 3 for rotation of the substrate 1, represent the control by the UCC of these components. Naturally, it can be envisaged that the analogue or digital signals passing through these connections circulate not only in the direction UCC→peripherals, but also in the opposite direction.

FIG. 2 also includes an axis OA representing the "outward" path $T_{OA}$ and the "return" path $T_{AO}$ for the sweep of the spraying means 7 driven by the movement system 9 for metallizing the substrate 1 which can be driven in rotation about the axis Z-Z shown in FIG. 1.

In the example of FIG. 2, the axis Z-Z is substantially orthogonal to the axis OA representing the paths $T_{OA}$ and $T_{AO}$ of the spraying means in movement.

The nozzle 7 of the spraying means 5 or the nozzle 7'/7" of the spraying means 5'/5" produces, along the path OA corresponding to the spraying phase, an Ox and/or Red aerosol spraying cone or a spraying cone of aerosol or of vapours of wetting liquid which sweeps the surface of the substrate 1 to be metallized, wetted or rinsed.

The invention may have implications for all the fields concerned with surface treatment, namely for example the automotive, aeronautical, mechanical, electronic fields and in general all fields where chemical nickel is used.

The invention will be better understood, and its advantages and variants will become clearly apparent from the following examples of implementation of the method according to the invention.

EXAMPLES

I—Device Used

The device used in the examples is of the type described above with reference to FIGS. 1 and 2.

The means 2 for holding the substrate to be metallized comprise a motor 3 for rotating the substrate 1 (brushless servomotor controlled by a SERAD MD230/M/2 digital variable drive. This motor is provided with a rotary plate on which the substrate can be fixed.

The spraying unit comprises three main parts:

1—A source of compressed air 13 originating from an oil compressor (1-8 bars) or a source of nitrogen stored under pressure.

2—Two separate tanks 12: each contains a solution (the oxidizing agent and the reducing agent respectively) the mixture of which will constitute the reaction medium. Each tank is sealed, making it possible for the interior to be pressurized. A stainless steel tube is submerged in the solutions, making it possible to convey them to the spray gun using a flexible tube. A regulator connected to the source of compressed air makes it possible to vary the pressure on the solutions and their flow rate in the spraying means 5.

3—These spraying means 5 comprise a spray gun 6 which is an automatic AGPV 569/579 spray gun marketed by ITW—Surface & Finitions S.A. The spray gun 6 comprises an inlet part 8 for the Ox/Red solutions and two concentric stainless steel nozzles 7 making it possible to nebulize and homogenize the mixture of the two solutions. Adjustments at the level of the spray gun head allow a more or less homogenous conical spray to be obtained.

The movement system 9 of the spraying means 5 comprises an aluminium frame including a shaft 10—linear shaft EL Z60—which is motor-driven (motor 11 brushless servomotor) controlled by a digital SERAD MD230/M/2 variable drive allowing the spray gun(s) 6,7 to move by translational movement along paths $T_{OA}$ and $T_{AO}$.

The device comprises combined spraying means 5'/5" for the aerosol or vapours of wetting fluid and of rinsing fluid. These means 5'/5" are constituted by a pneumatic single-spray nozzle 7'/7" connected to a supporting part 6'/6". These means 5'/5" are combined with the above-described movement system 9 which makes it possible to move the combined wetting and rinsing spray gun(s) 6'/6", 7'/7" translatably along the paths $T_{OA}$ and $T_{AO}$.

Automation is provided by a processing and control unit (a microcomputer) which controls:

the flow rates of the solutions so as to adjust the Ox/Red flow ratio,
the motor 3 for rotating the substrate 1,
the wetting means 5',
the spraying means 5 for Ox/Red,
the rinsing means 5",
and the movement system 9 of the spraying means 5, 5' and 5".

In particular, the processing and control unit is capable of controlling the switching between wetting and rinsing within the combined means 5'/5".

The growth of the metallic films is monitored using a quartz balance of the "Maxtek PM 500" type. This is a device which makes it possible to measure the mass deposited on a given surface, in this case on a probe exposed to the metallization spray in the same way as the surface to be metallized. It is thus possible to track the thickness of the film in the knowledge of some important factors such as the density and the acoustic impedance of the film deposited.

The measurement is carried out during the relaxation phases, i.e. during the sweep along $T_{OA}$; the thickness of the film is measured with the balance after the rinsing phases.

II—Methodology

II.1 Treatment of the Substrates for Deposition

The surfaces of the substrates can be subjected to a chemical and/or mechanical treatment, or not. The latter can be polishing by roughening using sandpaper or by sand-blasting with alumina granules. As regards the chemical treatments, standard etching solutions are used, such as sulphochromic mixtures or permanganates. The purpose of these treatments is to increase the adherence of the films. In order to make the surface of the substrates more uniform and standardized, a levelling primer (varnish) can be used, previously deposited on the surface. For plastic substrates an activation stage using a colloidal PdSn solution is necessary. A duration of 25 minutes in the colloidal solution makes it possible to activate to saturation. The duration of the 1M HCl acceleration stage is one minute. For the degreasing, alcohols are used, for example: methanol for plastics and a 50/50 mix of toluene and acetone for conductive substrates. In all cases, aqueous degreasing agents can be used to simplify the procedure and protect the environment.

II.2 Spraying Procedure

The following Examples 1 to 8 provide an illustration.

Comparative Example 1

Metallization Procedure According to Patent FR-B-2763962

Deposition of a metallic film constituted by a Ni—B alloy on an ABS (plastic) substrate.
The Following are Defined:
Δt: spraying duration in ms.
Γ: duration of the relaxation in ms.
ΔS: spraying sequence in ms.
*$q_r$: flow rate of the reducing solution in ml/pulsation (spraying)
*$q_m$: flow rate of the solution(s) of metal salt(s) in ml/pulsation (spraying).
The spraying device used comprises an air compressor, 2 tanks and a manual spray gun of the MSV 2 K type.
Operating Conditions
1. Oxidizing solution: $NiCl_2$, $6H_2O$ at 13 g/l.
2. Reducing solution: $KBH_4$ at 15 g/l.
3. Rinsing water: Deionised water.
4. Substrate: An ABS polymer having a surface area of 300 $cm^2$ (30 cm×10 cm).

As shown in FIG. 3, the substrate is subdivided into 3 zones, on each of which a spray is sprayed, obtained by nebulization of the mixture of both oxidizing and reducing solutions, the droplet size of this spray being 50 μm, according to a protocol as defined in FIG. 1 of patent FR-B-2 763 962.
R: Rinsing step t: time M: mass.
The solutions are sprayed for time Δt=550 ms.
For time Γ=900 ms, the solutions are not sprayed, the fluid film on the surface of the substrate is no longer supplied with reactant.

ΔS represents a spraying sequence corresponding to 50 pulsations (or sprayings)/relaxations.

Between each step of the spraying sequence, a rinsing step is carried out, with R=1500 ms.

The spraying distance conditions are such that the path is rectilinear with respect to the surface.

The spraying spray is produced by nebulization of the solutions, the droplet size of which is 50 μm.

Example 1

Metallization Procedure According to the Invention

Deposition of a metallic film constituted by a Ni—B alloy onto an ABS (plastic) substrate.
Operating Conditions
The spraying device used is that described above in I and shown in FIG. 2.
1. Oxidizing solution: $NiCl_2$, $6H_2O$ at 13 g/l.
2. Reducing solution: $KBH_4$ at 15 g/l.
3. Wetting solution: Deionized water sprayed onto the surface to be metallized, having a flow rate of 10 ml/s, with the spraying means 5' configured as wetting spraying means.
4. Rinsing water: Deionized water sprayed onto the surface to be metallized, having a flow rate of 20 ml/s, with the spraying means 5" configured as rinsing spraying means.
5. Substrate: an ABS polymer having a surface area of 300 $cm^2$ (30 cm×10 cm) as shown in FIGS. 1 and 2.
6. k: nickel constant comprised between 1 and 6 s.
7. $V_{OA}$: 0.5 m/s
8. Rotation about the Z-Z axis in FIGS. 1 and 2, which is median and orthogonal to the length of the plate at a speed of: 8 rpm "with stop phases during the cycle". The rotation starts after the rinsing phase (angle 30°)
Start-up by the UCC of the wetting -$a_p$- of the substrate to form a fluid film on the surface: Wetting solution sprayed for 10 s by the nozzle 6' during the travel OA.
Rotational motion of the substrate is initiated. Speed Vr.
Start-up by the UCC immediately (10 s) after the end of wetting of the 10 (n=10) spraying/relaxation cycles: sweeping OA then AO.
The spray gun is set in motion by the UCC at a speed $V_{OA}$=0.5 m/s with continuous spraying of a spray obtained by nebulization of the mixture of both oxidizing and reducing solutions, the droplet size of this spray being 50 μm.
Return of the spray gun 6 to the point of origin along the path AO at a speed, $$V_{AO}=AO/[k-(OA/V_{OA})]=0.2 \text{ m/s}$$

After 10 spraying/relaxation cycles (n=10), a rinsing step is carried out with the pneumatic single-spray nozzle 6", each rinsing step having a duration of 1500 ms during one travel OA.
The total number N of spraying/relaxation cycles carried out is 100.

Example 2

Results of Comparative Example 1 and Example 1

Comparative Example 1: The nickel deposit obtained can be welded and is adherent. The hardness of the deposit is of the order of 400 to 500 Vickers.

Example 1: The nickel film obtained in this way can be welded and is very adherent over the entire surface of the piece. It is perfectly homogeneous. It has a thickness of 0.5 µm. The hardness of the deposit is of the order of 400 to 500 Vickers.

FIGS. 4A and 4B represent the deposits obtained in Comparative Example 1 and in Example 1.

The deposits obtained using the procedure of Comparative Example 1 are not homogeneous over the entire surface. On the other hand, using the improved procedure of Example 1 the deposit is perfectly homogeneous over the entire surface of the substrate.

The consumption of raw materials in Example 1 is markedly less than that of Comparative Example 1. More precisely, the computerized control of the flow rates allows a ratio of the order of 1.5 between the consumption of oxidizing solution and reducing solution in Comparative Example 1 and the consumption of oxidizing solution and reducing solution in Example 1.

Example 3

Deposition of a Cu Metallic Film on a Glass Fibre-Filled Epoxy Polymer Substrate Having a Surface Area of 300 cm² (30 cm×10 cm)

Operating Conditions

The spraying device used is that described above in I and shown in FIG. 2.
1. Oxidizing solution: $CuSO_4$, $8H_2O$ at 9 g/l.
2. Reducing solution: $KBH_4$ at 15 g/l.
3. Wetting solution: Deionized water sprayed onto the surface to be metallized, having a flow rate of 10 ml/s, with the spraying means 5' configured as wetting spraying means.
4. Rinsing water: Deionized water sprayed onto the surface to be metallized, having a flow rate of 20 ml/s, with the spraying means 5" configured as rinsing spraying means.
5. Substrate: an ABS polymer having a surface area 300 cm² (30 cm×10 cm) as shown in FIGS. 1 and 2.
6. k: copper constant comprised between 2 and 9 s
7. $V_{OA}$: 0.05 m/s
8. Rotation about the Z-Z axis in FIGS. 1 and 2, which is median and orthogonal to the length of the plate at a speed of: 8 rpm "with stop phases during the cycle". The rotation starts after the rinsing phase (angle 30°)
    Start-up by the UCC of the wetting -$a_p$- of the substrate to form a fluid film on the surface: Wetting solution sprayed for 10 s by the nozzle 6' during the travel OA.
    The substrate is rotated. Speed Vr
    Start-up by the UCC immediately (10 s) after the end of wetting of the 10 (n=10) spraying/relaxation cycles: sweeping OA then AO.
        The spray gun is set in motion by the UCC at a speed $V_{OA}$=0.05 m/s with continuous spraying of a spray obtained by nebulization of the mixture of both oxidizing and reducing solutions, the droplet size of this spray being 50 µm.
        Return of the spray gun 6 to the point of origin along the path AO at a speed, $V_{AO}=AO/[k-(OA/V_{OA})]=0.3$ m/s After 10 spraying/relaxation cycles (n=10), a rinsing step is carried out with the pneumatic single-spray nozzle 6", each rinsing step having a duration of 1500 ms during one travel OA.

The total number N of spraying/relaxation cycles carried out is 100.
Results:

The copper films obtained in this way can be welded and are very adherent over the entire surface of the piece. They are perfectly homogeneous. Their thickness is of the order of 0.5 µm. The electrical resistivity of the metallic film obtained is of the order of 0.02 Ω/cm.

Example 4

Deposition of a Metallic Film Constituted by a Ternary Ni—B Alloy on an ABS (Plastic) Substrate Operating Conditions The spraying device used is that described above in I and shown in FIG. 2.
1. Oxidizing solution: $NiSO_4$ $NaH_2PO_2$. Molar ratio between 0.15 and 0.5.
2. Flow rate 0.5 ml/spraying.
3. Reducing solution: $KBH_4$ at 15 g/l.
4. Wetting solution: Deionized water sprayed onto the surface to be metallized, having a flow rate of 10 ml/s, with the spraying means 5' configured as wetting spraying means.
5. Rinsing water: Deionized water sprayed onto the surface to be metallized, having a flow rate of 20 ml/s, with the spraying means 5" configured as rinsing spraying means.
6. Substrate: an ABS polymer having a surface area 300 cm² (30 cm×10 cm) as shown in FIGS. 1 and 2.
7. $V_{OA}$: 4 m/s
8. Rotation about the Z-Z axis in FIGS. 1 and 2, which is median and orthogonal to the length of the plate at a speed of: 8 rpm "with stop phases during the cycle". The rotation starts after the rinsing phase (angle 30°).
    Start-up by the UCC of the wetting -$a_p$- of the substrate to form a fluid film on the surface: Wetting solution sprayed for 10 s by the nozzle 6' during the travel OA.
    The substrate is rotated. Speed Vr.
    Temperature of the device enclosure is controlled between 25 and 45° C.
    Start-up by the UCC immediately (10 s) after the end of wetting of the 10 (n=10) spraying/relaxation cycles: sweeping OA then AO.
        Movement of the spray gun is initiated by the UCC at a speed $V_{OA}$=4 m/s with continuous spraying of a spray obtained by nebulization of the mixture of both oxidizing and reducing solutions, the droplet size of this spray being 50 µm.
        Return of the spray gun 6 to the point of origin along the path AO at a speed, $V_{AO}=AO/[k-(OA/V_{OA})]=2$ m/s After 10 spraying/relaxation cycles (n=10), a rinsing step is carried out with the pneumatic single-spray nozzle 6", each rinsing step having a duration of 1500 ms during one travel OA.

The total number N of spraying/relaxation cycles carried out is 100.
Results:

The nickel-boron-phosphorus film obtained in this way can be welded and is very adherent over the entire surface of the substrate. It is perfectly homogeneous. It has a thickness of 0.64 µm. The deposit contains from 4 to 5% boron and 4 to 5% phosphorus. The density is ρ=7.3.

Example 5

Deposition of a Metallic Film Constituted by a Ternary Ni—B—P Alloy with PTFE Particles on an ABS (Plastic) Substrate Operating Conditions The spraying device used is that described above in I and shown in FIG. 2.
1. Oxidizing solution: $NiSO_4$ $NaH_2PO_2$. Molar ratio between 0.15 and 0.5.
2. Flow rate 0.5 ml/spraying.
3. Reducing solution: $KBH_4$ at 15 g/l.
4. Suspension of PTFE Teflon beads having an average diameter=500 nm, at a concentration of 15 g/l in the oxidizing solution.
5. Wetting solution: Deionized water sprayed onto the surface to be metallized, having a flow rate of 5 ml/s, with the spraying means 5' configured as wetting spraying means.
6. Rinsing water: Deionized water sprayed onto the surface to be metallized, having a flow rate of 1 ml/s, with the spraying means 5" configured as rinsing spraying means.
7. Substrate: An ABS polymer having a surface area of 300 $cm^2$ (30 cm×10 cm) as shown in FIGS. 1 and 2.
8. $V_{OA}$: 4 m/s.
9. Rotation about the Z-Z axis in FIGS. 1 and 2, which is median and orthogonal to the length of the plate at a speed of: 8 rpm "with stop phases during the cycle". The rotation starts after the rinsing phase (angle 30°)
   Start-up by the UCC of the wetting -$a_p$- of the substrate to form a fluid film on the surface: Wetting solution sprayed for 10 s by the nozzle 6' during the travel OA. The substrate is rotated. Speed Vr.
   Temperature of the device enclosure is controlled between 25 and 45° C.
   Start-up by the UCC immediately (10 s) after the end of wetting of the 10 (n=10) spraying/relaxation cycles: sweeping OA then AO.
      Movement of the spray gun is initiated by the UCC at a speed $V_{OA}$=4 m/s with continuous spraying of a spray obtained by nebulization of the mixture of both oxidizing and reducing solutions, the droplet size of this spray being 50 µm.
      Return of the spray gun 6 to the point of origin along the path AO at a speed, $$V_{AO}=AO/[k-(OA/V_{OA})]=2 \text{ m/s}$$

After 10 spraying/relaxation cycles (n=10), a rinsing step is carried out with the pneumatic single-spray nozzle 6", each rinsing step having a duration of 1500 ms during one travel OA.
The total number N of spraying/relaxation cycles carried out is 100.
Results:
   The nickel-boron-phosphorus film obtained in this way can be welded and is very adherent over the entire surface of the piece. It is perfectly homogeneous. It has a thickness of 0.64 µm. The deposit contains from 4 to 5% boron and 4 to 5% phosphorus and 22% PTFE. The density is ρ=6.2. The coefficient of friction obtained is of the order of 0.1.

Example 6

Deposition of a Multilayer Metallic Film Alternately Cu/Ni on a Glass Fibre-Filled Epoxy Polymer Substrate Having a Surface Area of 300 $cm^2$ (30 cm×10 cm)

Operating Conditions
The spraying device used is that described above in I and shown in FIG. 2.
1. Oxidizing solution 1: $CuSO_4$, $8H_2O$ at 9 g/l.
2. Reducing solution 1: $KBH_4$ at 15 g/l.
3. Oxidizing solution 2: $NiCl_2$, $6H_2O$ at 13 g/l.
4. Reducing solution 2: $KBH_4$ at 15 g/l.
5. Wetting solution: Deionized water sprayed onto the surface to be metallized, having a flow rate of 10 ml/s, with the spraying means 5' configured as wetting spraying means.
6. Rinsing water: Deionized water sprayed onto the surface to be metallized, having a flow rate of 20 ml/s, with the spraying means 5" configured as rinsing spraying means.
7. Substrate: An epoxy polymer having a surface area of 300 $cm^2$ (30 cm×10 cm) as shown in FIGS. 1 and 2.
8. $V_{OA}$: 0.5 m/s
9. Rotation about the Z-Z axis in FIGS. 1 and 2, which is median and orthogonal to the length of the plate at a speed of: 8 rpm "with stop phases during the cycle". The rotation starts after the rinsing phase (angle 30°)
   Start-up by the UCC of the wetting -$a_p$- of the substrate to form a fluid film on the surface: Wetting solution sprayed for 10 s by the nozzle 6' during the travel OA. The substrate is rotated. Speed Vr.
   Temperature of the device enclosure is controlled between 25 and 45° C.
   Start-up by the UCC immediately (10 s) after the end of wetting, with alternately:
   a sub-sequence Δs having m=15 spraying/relaxation cycles of an aerosol of oxidizing solution 1 and reducing solution 1 in order to form a layer of copper: sweeping OA then AO.
      Movement of the spray gun is initiated by the UCC at a speed $V_{OA}$=0.5 m/s with continuous spraying of a spray obtained by nebulization of the mixture of both oxidizing solution 1 and reducing solution 1, the droplet size of this spray being 50 µm.
      Return of the spray gun 6 to the point of origin along the path AO at a speed, $$V_{AO}=AO/[k-(OA/V_{OA})]=0.3 \text{ m/s}$$

After 15 spraying/relaxation cycles, a rinsing step is carried out with the pneumatic single-spray nozzle 6", each rinsing step having a duration of 1500 ms during one travel OA.
   a sub-sequence Δs having m=15 spraying/relaxation cycles of an aerosol of oxidizing solution 2 and reducing solution 2 in order to form a layer of nickel: sweeping OA then AO.
      Movement of the spray gun is initiated by the UCC at a speed $V_{OA}$=0.5 m/s with continuous spraying of a spray obtained by nebulization of the mixture of both oxidizing and reducing solutions, the droplet size of this spray being 50 µm.
      Return of the spray gun 6 to the point of origin along the path AO at a speed, $$V_{AO}=AO/[Dr-(OA/V_{OA})]=0.3 \text{ m/s}$$

After 15 spraying/relaxation cycles, a rinsing step is carried out with the pneumatic single-spray nozzle 6", each rinsing step having a duration of 1500 ms during one travel OA This succession of alternate sub-sequences is repeated 10 times, so that the total number N of spraying/relaxation cycles is 150.

Results:

A multilayer of alternately Cu/Ni is obtained. This film can be welded and is very adherent over the entire surface of the piece. It is perfectly homogeneous. Its thickness is of the order of 0.7 μm. The multilayer metallic film obtained has a resistance to salt spray of the order of 500 hours, in the ASTM BI 17 test with 5% NaCl, at 35° C., at pH 6.5 and 7.

Example 7

Deposition of a Metallic Ag Film on an ABS (Cylinder) Substrate of Dimensions (Diameter: 5 cm, Height: 9 cm)

Operating Conditions

The spraying device used is that described above in I and shown in FIG. 2.
1. Oxidizing solution: silver salts at 2 g/l.
2. Reducing solution: Glucose at 15 g/l.
3. Wetting solution: Deionized water sprayed onto the surface to be metallized, having a flow rate of 10 ml/s, with the spraying means 5' configured as wetting spraying means.
4. Rinsing water: Deionized water sprayed onto the surface to be metallized, having a flow rate of 20 ml/s, with the spraying means 5" configured as rinsing spraying means.
5. Substrate: A substrate of cylindrical ABS (diameter: 5 cm, height: 9 cm
6. Rotation about the Z-axis Z in FIGS. 1 and 2, which is median and orthogonal to the length of the plate at a speed of: 8 rpm "with stop phases during the cycle". The rotation starts after the rinsing phase (angle 30°)

Start-up by the UCC of the wetting -ap- of the substrate to form a fluid film on the surface: Wetting solution sprayed for 10 s by the nozzle 6' during the travel OA.

The substrate is rotated. Speed Vr.

Start-up by the UCC immediately (10 s) after the end of wetting of the 10 (n=10) cycles of spraying/relaxation: sweeping OA then AO.

After 10 spraying/relaxation cycles (n=10), a rinsing step is carried out with the pneumatic single-spray nozzle 6", each rinsing step having a duration of 1500 ms during one travel OA.

The total number N of spraying/relaxation cycles carried out is 40.

Results:

The silver films obtained in this way can be welded and are very adherent over the entire surface of the piece. They are perfectly homogeneous. Their thickness is of the order of 0.15 μm. The deposit is shiny and very reflective.

Example 8

Deposition of a Metallic Ag Film on an ABS (Cylinder) Substrate of Dimensions (Diameter: 5 cm, Height: 9 cm)

Operating Conditions

The spraying device used is that described above in I and shown in FIG. 2.

1. Oxidizing solution silver salts at 2 g/l.
2. Reducing solution: Glucose at 15 g/l.
3. Wetting solution: Deionized water sprayed onto the surface to be metallized, having a flow rate of 10 ml/s, with the spraying means 5' configured as wetting spraying means.
4. Rinsing water: Deionized water sprayed onto the surface to be metallized, having a flow rate of 20 ml/s, with the spraying means 5" configured as rinsing spraying means.
5. Substrate: A substrate of cylindrical ABS (diameter: 5 cm, height: 9 cm)
6. Rotation about the Z-Z axis in FIGS. 1 and 2, which is median and orthogonal to the length of the plate at a speed of: 8 rpm "with stop phases during the cycle". The rotation starts after the rinsing phase (angle 30°)

Start-up by the UCC of the wetting -$a_p$- of the substrate to form a fluid film on the surface: Wetting solution sprayed for 10 s by the nozzle 6'.

The substrate is rotated. Speed Vr.

Start-up by the UCC immediately (10 s) after the end of wetting of the 10 (n=10) cycles of spraying/relaxation:

After 10 spraying/relaxation cycles (n=10), a rinsing step is carried out with the pneumatic single-spray nozzle 6", each rinsing step having a duration of 1500 ms.

The total number N of spraying/relaxation cycles carried out is 40.

Results:

The silver films obtained in this way can be welded and are very adherent on the entire surface of the piece. They are perfectly homogeneous. Their thickness is of the order of 0.15 μm. The deposit is shiny and very reflective.

The invention claimed is:

1. Non-electrolytic method for metallizing at least part of the surface of a substrate by spraying of at least one aqueous and/or organic aerosol containing at least one metal in cationic (oxidizing) form and at least one reducing agent, capable of converting the metallic cation to metal, the method essentially consisting of:
  -1- carrying out the metallization spraying according to a succession of at least two spraying phases, alternating with relaxation phases: (i) setting the duration Dp of the spraying phases between $10^{-2}$ and 5 s, for the same unit area, and the duration Dr of the relaxation phases between $10^{-2}$ and 10 s, for the same unit area, the durations Dp and Dr of these spraying and relaxation phases being identical to or different from each other, (ii) and adjusting the spraying flow rate(s), such that the Ox/Red electronic ratio is comprised between 0.01 and 15, and thus allows the formation of a metallic film which is chemically adherent to the substrate;
  -2- interrupting the spraying as soon as the intended level of metal deposition is reached,
  wherein the improvement consists in:
  implementing at least one preliminary stage -$a_p$- which consists in forming a fluid film consisting of water on an least part of the surface of the substrate;
  and, following the preliminary stage -$a_p$-, commencing the spraying according to stage -1 - at the latest 60 s after the end of the preliminary stage -$a_p$-.
2. Method according to claim 1, comprising a step -0 - consisting in sensitizing and/or activating the surface to be metallized, in order to make it catalytic.

3. Method according to claim 1, wherein the durations Dp and Dr of spraying and relaxation respectively are such as Dp+Dr =k, wherein k is a time, comprised between $10^{-1}$ and 13 s, k being constant during the metallization spraying stage.

4. Method according to claim 1, wherein:
- at least part of the metallization spraying is carried out dynamically by moving spraying means with respect to the substrate so as to carry out a periodic sweep of at least 80%, of the surface to be metallized;
- for a given unit area comprised within the sweep zone:
  - the spraying phase has a duration Dp corresponding to the duration for which the unit area is subjected to the spraying of the aerosol,
  - the relaxation phase which follows this spraying phase has a duration Dr corresponding to the duration of the sweep of the remainder of the surface to be metallized by the spraying means,
- the movement of the spraying means is defined such that:
  - said spraying means are moved along a path $T_{OA}$ between a point of origin (O) and an arrival point (A) at a spraying movement speed $V_{OA}$,
  - as soon as the spraying means reach the point (A), they return to the point (O) at a speed $V_{AO}$ of movement without spraying along a path $T_{AO}$;
- $V_{AO}$ being calculated by taking into account the distance AO between (A) and (O) along the path $T_{AO}$ and $V_{OA}$, so that the duration Dr of the relaxation phase of each unit area of the surface to be metallized swept by the spraying means as well as the constant k is as defined above.

5. Method according to claim 4, wherein the substrate is rotated, during at least part of the metallization spraying.

6. Method according to claim 4, wherein stage 1 is cyclic, each cycle comprising a spraying phase and a relaxation phase, corresponding to the spraying means moving from (O) to (A) and back and in that the total number of N cycles implemented is chosen as a function of the level of deposition of metal finally sought and the level of deposition of metal obtained in each cycle, this total number of N cycles being comprised between 2 and 5000.

7. Method according to claim 4, wherein the path $T_{AO}$ is straight and direct.

8. Method according to claim 4, wherein the formula for calculating $V_{AO}$ is as follows:

$$V_{AO} = AO/[k - (OA/V_{OA})]$$

wherein - $V_{OA}$ is the spraying movement speed of the spraying means which are moved along the path $T_{OA}$ between the point of origin (O) and the arrival point (A),
- $V_{AO}$ is the spraying movement speed of the spraying means which return from the arrival point (A) to the point of origin (O) along the path $T_{AO}$,
- OA is the distance between (O) and (A) along the path $T_{OA}$, and
- AO is the distance between (A) and (O) along the path $T_{AO}$.

9. Method according to claim 4, wherein $V_{OA}$ is comprised between 0.01 and 20 m/s.

10. Method according to claim 1, wherein the improvement has the following characteristics:
- at least part of the metallization spraying is carried out dynamically by moving spraying means with respect to the substrate and/or by moving the substrate with respect to spraying means so as to carry out a periodic sweep of at least 80%, of the surface to be metallized;
- for a given unit area and comprised within the sweep zone:
  - the spraying phase has a duration Dp corresponding to the duration during which the unit area is subjected to the spraying of the aerosol,
  - the relaxation phase which follows this spraying phase has a duration Dr corresponding to the duration of the sweep of the remainder of the surface to be metallized by the spraying means.

11. Method according to claim 10, wherein the movement of the substrate with respect to the spraying means is a rotation.

12. Method according to claim 1, wherein the duration Dr of the relaxation phase corresponds to the duration for which the unit area is not subjected to the spraying of the aerosol.

13. Method according to claim 1, which is carried out in a metallization enclosure, the temperature of which is controlled.

14. Method according to claim 1, wherein that the preliminary stage -$a_p$- is carried out by spraying of the vapours of water and/or of an aerosol of water and/or by immersion in a bath of water, said water being optionally heated.

15. Method according to claim 1, wherein the water used in the preliminary stage -$a_p$- is chosen from the group consisting of deionized water and non-deionized water.

16. Method according to claim 1, wherein that the substrate is rotated during stage -1-, at a speed comprised between 1 and 30 rpm.

17. Method according to claim 1, wherein:
- sludges are produced at the end of the metallization, said sludges containing metal oxides and wherein said sludges are recovered;
- these sludges are filtered which produces a retentate containing one or several metal hydroxides;
- the retentate is dissolved using at least one strong acid;
- the pH of the solution of retentate in the strong acid is increased so as to precipitate the metal hydroxide or successively the different metal hydroxides corresponding to the metal or metals used in the metallization;
- the metal hydroxide precipitate(s) are collected separately.

18. Method according to claim 17, wherein and this (or these) metal hydroxide(s) are recycled in the metallization method.

* * * * *